(12) United States Patent
Fukumoto

(10) Patent No.: US 9,650,182 B2
(45) Date of Patent: May 16, 2017

(54) STORAGE DEVICE

(71) Applicant: NIFCO INC., Yokohama-shi, Kanagawa (JP)

(72) Inventor: Mitsuru Fukumoto, Yokohama (JP)

(73) Assignee: NIFCO INC., Yokohama-Shi, Kanagawa (JP)

(*) Notice: Subject to any disclaimer, the term of this patent is extended or adjusted under 35 U.S.C. 154(b) by 0 days.

(21) Appl. No.: 14/385,024

(22) PCT Filed: Mar. 7, 2013

(86) PCT No.: PCT/JP2013/001430
§ 371 (c)(1),
(2) Date: Sep. 12, 2014

(87) PCT Pub. No.: WO2013/136728
PCT Pub. Date: Sep. 19, 2013

(65) Prior Publication Data
US 2015/0041469 A1 Feb. 12, 2015

(30) Foreign Application Priority Data
Mar. 14, 2012 (JP) .................................. 2012-057981

(51) Int. Cl.
*B65D 43/26* (2006.01)
*B60R 7/04* (2006.01)
(Continued)

(52) U.S. Cl.
CPC ............. *B65D 43/26* (2013.01); *B60N 3/101* (2013.01); *B60N 3/102* (2013.01); *B60R 7/04* (2013.01); *E05F 3/14* (2013.01)

(58) Field of Classification Search
CPC ........ B65D 43/26; B60N 3/101; B60N 3/102; B60R 7/04
(Continued)

(56) References Cited

U.S. PATENT DOCUMENTS 5,520,313 A * 5/1996 Toshihide ............ B60N 2/4686
220/815
7,451,888 B2 * 11/2008 Tanaka ................... B65D 43/26
220/263
(Continued)

FOREIGN PATENT DOCUMENTS

JP 3314903 B2 5/2002
JP 2006-182149 A 7/2006
(Continued)

OTHER PUBLICATIONS

PCT, International Search Report for PCT/JP2013/001430.

*Primary Examiner* — Anthony Stashick
*Assistant Examiner* — James Way
(74) *Attorney, Agent, or Firm* — Manabu Kanesaka

(57) ABSTRACT

A storage device includes a box-shaped case having an opening; an opening/closing body opening and closing the opening; a guide device extended along a predetermined straight line on a side wall of the case; a slider supported in the guide device slidably along the straight line; an arm extending from the opening/closing body, supported in the slider rotatably around a predetermined axis line, and having a first gear around the axis line; and a rack extended in the side wall parallel to the straight line, and engaged with the first gear. When the opening/closing body rotates around the axis line relative to the case, the first gear and the rack are engaged with each other so that the opening/closing body moves along the straight line together with the slider.

9 Claims, 11 Drawing Sheets

(51) Int. Cl.
*E05F 3/14* (2006.01)
*B60N 3/10* (2006.01)

(58) Field of Classification Search
IPC .................................................. B65D 43/26
See application file for complete search history.

(56) References Cited

U.S. PATENT DOCUMENTS

| | | | | |
|---|---|---|---|---|
| 7,766,407 | B2* | 8/2010 | Nakaya | B60N 3/08 |
| | | | | 292/334 |
| 8,556,118 | B2* | 10/2013 | Hamaguchi | B60N 3/102 |
| | | | | 16/304 |
| 2001/0014993 | A1* | 8/2001 | Orita | E05F 5/00 |
| | | | | 16/82 |
| 2007/0034636 | A1* | 2/2007 | Fukuo | B60R 7/06 |
| | | | | 220/830 |
| 2009/0095764 | A1* | 4/2009 | Schaal | B60N 3/101 |
| | | | | 220/737 |
| 2010/0102061 | A1* | 4/2010 | Hamaguchi | B60N 3/08 |
| | | | | 220/255 |
| 2010/0154309 | A1* | 6/2010 | Shibata | B60R 7/04 |
| | | | | 49/338 |
| 2012/0104011 | A1* | 5/2012 | Tsunoda | B60N 3/106 |
| | | | | 220/810 |

FOREIGN PATENT DOCUMENTS

| | | |
|---|---|---|
| JP | 2006-218941 A | 8/2006 |
| JP | 3833925 B2 | 10/2006 |
| JP | 2007-313983 A | 12/2007 |
| JP | 2009-249945 A | 10/2009 |
| JP | 2011-152813 A | 8/2011 |

\* cited by examiner

STORAGE DEVICE

RELATED APPLICATIONS

The present application is National Phase of International Application No. PCT/JP2013/001430 filed Mar. 7, 2013, and claims priority from Japanese Application No. 2012-057981, filed Mar. 14, 2012.

FIELD OF TECHNOLOGY

The present invention relates to a storage device used as, for example, a cup holder for an automobile.

BACKGROUND ART

In the automobile, there is integrated a storage device for housing a beverage container or a small article in an instrument panel, a center console, and the like. This kind of storage device includes a box-shaped case opening upward, and a lid opening and closing an opening of the case (for example, Patent Document 1). The lid includes a pair of arms extending to outer face sides of right and left side walls of the case in right and left side portions thereof, and in the arms, the lid is rotatably supported on the right and left side walls of the case around a predetermined axis line. In the storage device, the lid rotates by tracing an arc locus around an axis line, so that if a position of a rotation axis is determined such that the lid and the case do not interfere at a rotation time, there is a problem that an end edge of the lid protrudes upward more than the case in an open position. Also, in a case wherein the position of the rotation axis is determined such that the end edge of the lid does not protrude upward more than the case, the arms become longer, and in a fully open position, the lid is disposed at a position located away from the case, and there is a problem that a wide space for the lid is required around the storage device.

With respect to the aforementioned problems, there is a storage device comprising a first fixation gear having an arc shape and an internal tooth shape on a side wall of the case; a second fixation gear having a circular shape and an external tooth shape disposed inside the first fixation gear; a first arm gear engaging with the first fixation gear in an arm; and a second arm gear coaxially and rotatably supported with the first arm gear in the arm, and engaging with the second fixation gear (for example, Patent Document 2). In the storage device, when the lid opens and closes, the first arm gear moves on the first fixation gear, so that a rotational axis line of the lid moves relative to the case. Consequently, the lid moves around a position approaching the case while preventing the interference between the lid and the case, and even in the fully open position, the lid is positioned near the case. Consequently, the storage device can be made compact.

PRIOR ART DOCUMENTS

Patent Documents

Patent Document 1: Japanese Patent No. 3314903
Patent Document 2: Japanese Patent No. 3833925

SUMMARY OF THE INVENTION

Problems to be Solved by the Invention

In the arm (the lid) of the storage device according to the Patent Document 2, the position of the rotation axis thereof is determined by an engagement between the first arm gear and the first fixation gear, and an engagement between the second arm gear and the second fixation gear, and an axis portion is not rotatably supported directly in another member. Consequently, when a load or a vibration is applied to the lid and the arm, a slippage or falling occurs in the rotation axis, so that there is a risk that a movement becomes unstable. Also, the storage device according to the Patent Document 2 includes a tensile coil spring between the case and the arm, and urges the lid in an open direction. However, the first fixation gear is formed in the arc shape, so that depending on an open or a closed position of the lid, an engagement direction between the first fixation gear and the first arm gear changes. Consequently, a backlash direction and an urging direction of the tensile coil spring do not coincide, so that there is a risk that rattling occurs in an engagement portion of the gears. In a case wherein such storage device is attached to a device having a source of vibration such as a vehicle and the like, there is a risk that a vibration sound (a low frequency sound) caused by a backlash occurs.

The present invention is made in view of the aforementioned backgrounds, and an object of the present invention is that in a storage device including an opening/closing body rotatable around a moving rotational axis line, the opening/closing body is stably supported.

Means for Solving the Problems

In order to obtain the aforementioned object, the present invention is a storage device (1) comprising a box-shaped case (3) including an opening (2), and an opening/closing body (4) opening and closing the opening, and in a side wall (30) of the aforementioned case, there are included a guide device (34) extending along a predetermined straight line (B); a slider 5 supported in the guide device slidably along the straight line; an arm (19) extending from the opening/closing body, supported in the slider rotatably around a predetermined axis line (A), and including a first gear (24) around the axis line; and a rack (46) extended in the side wall parallel to the straight line, and engaged with the first gear. When the opening/closing body rotates around the axis line relative to the case, the first gear and the rack are engaged with each other, so that the opening/closing body moves along the straight line together with the slider.

According to the structure, the arm is rotatably supported in the slider supported in the case, so that a position relative to the case of the arm is controlled within a predetermined range, the engagement between the first gear and the rack is always maintained, and the opening/closing body rotates around the predetermined axis line.

Also, in the aforementioned invention, it is preferable that the storage device further includes an urging device (52) provided between the case and the slider to urge the slider to one side along the straight line relative to the case.

According to the structure, the first gear is always urged to one side along the straight line through the slider, so that the first gear and the rack always abut against each other so as to prevent from rattling. Thereby, even in a case wherein a vibration is applied to the storage device, a low frequency sound is controlled from being generated.

Also, in the aforementioned invention, it is preferable that the storage device further includes a damper device (40) provided between the slider and the arm to attenuate a rotation of the arm relative to the slider.

According to the structure, a rotational movement of the opening/closing body becomes slow so as to improve merchantability of the storage device.

Also, in the aforementioned invention, preferably, the damper device includes a housing (41) in which a viscous fluid is enclosed, and a rotor (42) whose one end is rotatably received in the housing, and whose other end protrudes from the housing. Also, preferably, the arm includes a second gear (25) around the axis line, and one of either the housing or the rotor is connected to the slider, and there is provided a third gear (44) engaging with the second gear on an outer peripheral face of the other of either the housing or the rotor.

According to the structure, one of either the housing or the rotor of the rotary damper is provided in the slider, a relative position between the second gear and the third gear is fixed, and the engagement between the second gear and the third gear is always maintained.

Also, in the aforementioned invention, the case may include a cover covering the side wall in such a way as to form a space between the case and an outer face side of the side wall, the arm may be disposed in the space, and the guide device may be provided at a portion facing the side wall side of the cover.

According to the structure, one portion of the side wall of the case is structured in a separate member as the cover, and the guide device is provided in the cover, so that the storage device can be easily formed and assembled.

Also, in the aforementioned invention, the urging device may be a coil spring whose one end may be locked in the cover, and whose other end may be locked in the slider.

According to the structure, the storage device can be easily formed and assembled.

Effect of the Invention

According to the aforementioned structures, in the storage device including the opening/closing body rotatable around the moving rotational axis line, the opening/closing body can be stably supported.

BEST MODES OF CARRYING OUT THE INVENTION

Hereinafter, with reference to the drawings, an embodiment in which the present invention is applied to a cup holder incorporated into a center console of an automobile will be explained. Hereinafter, for convenience of explanation, each direction of a cup holder 1 is determined as shown in FIG. 1.

Figure 1:
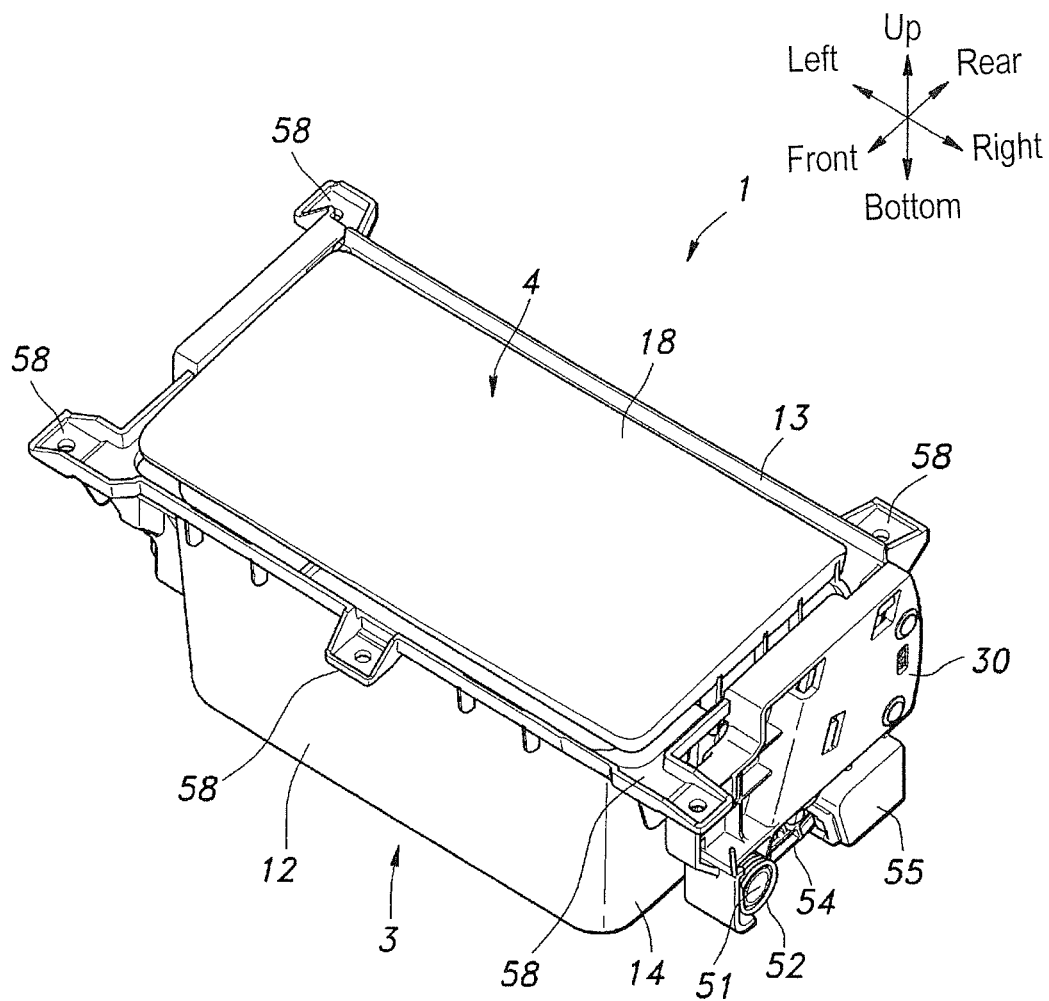
FIG. 1 is a perspective view showing a closed state of a cup holder according to an embodiment.
Figure 2:
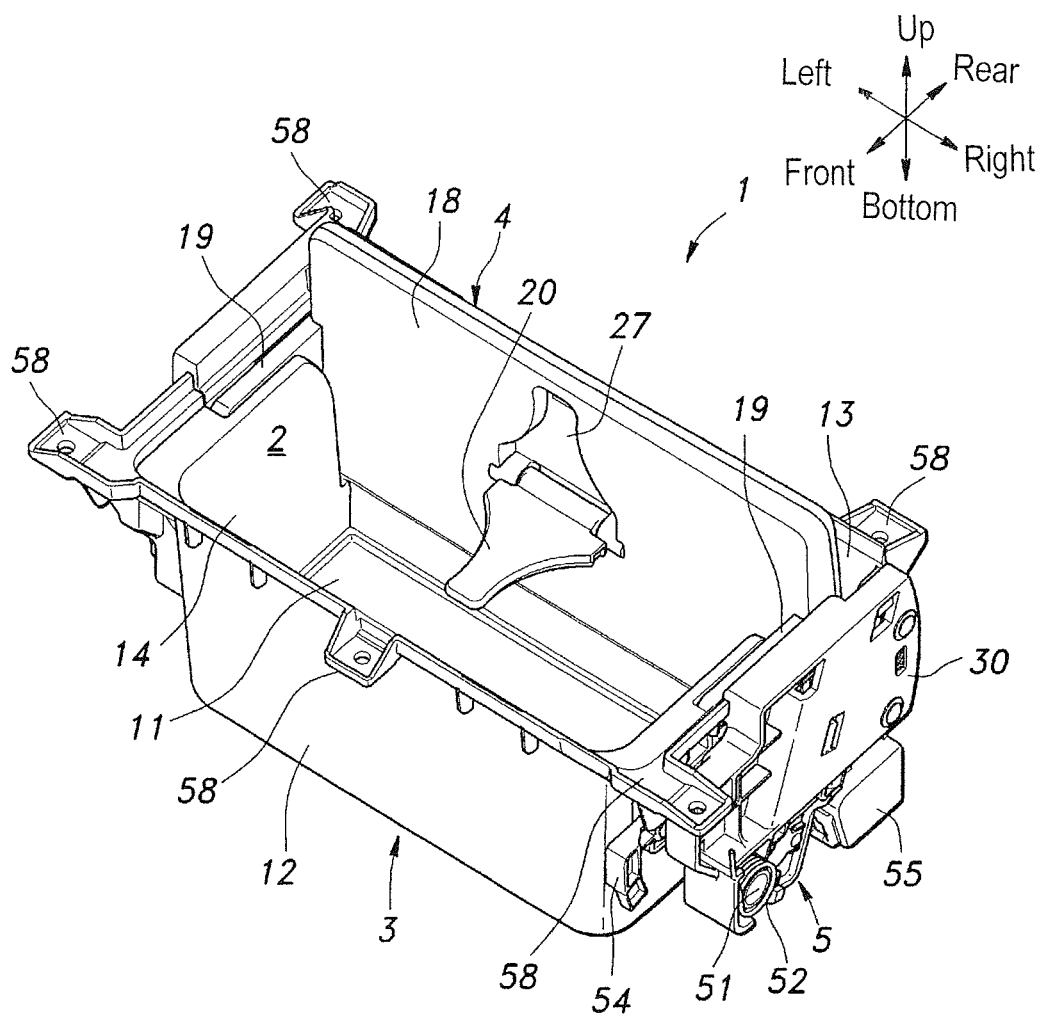
FIG. 2 is a perspective view showing an open state of the cup holder according to the embodiment.
Figure 3:
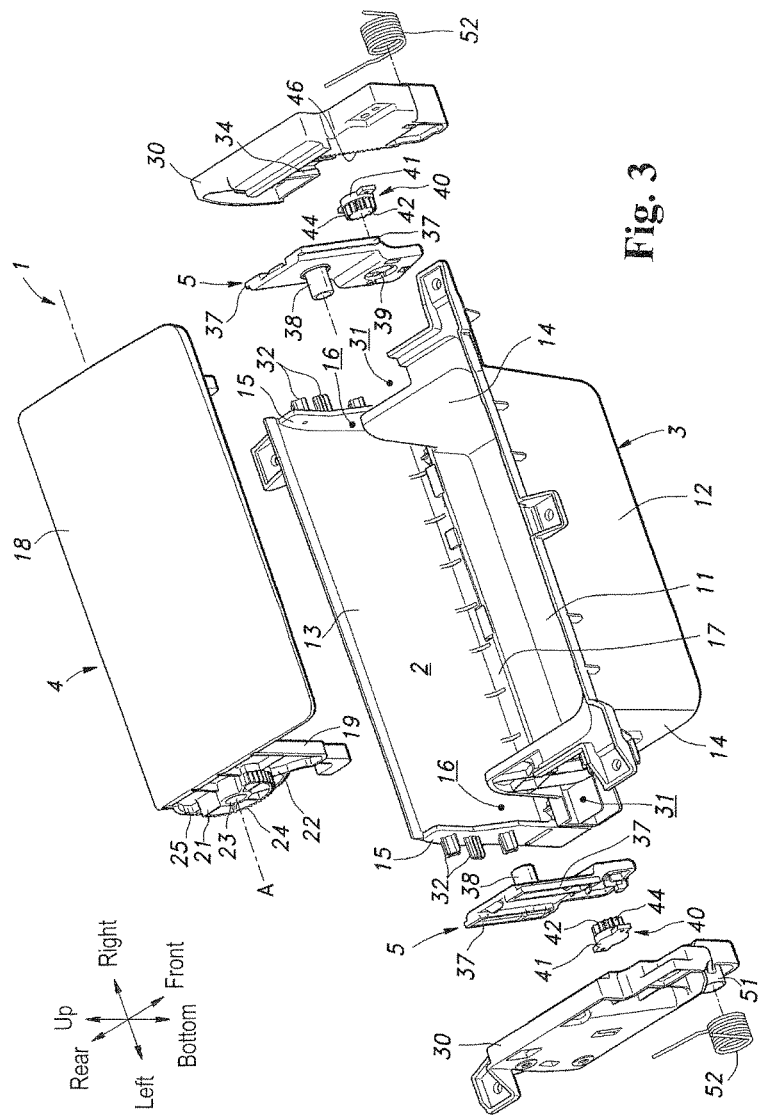
FIG. 3 is an exploded perspective view of the cup holder according to the embodiment.

As shown in FIG. 1 to FIG. 3, the cup holder 1 comprises a case 3 including an opening 2 (see FIG. 3) facing upward; a lid 4 opening and closing the opening 2; and a right-and-left pair of sliders 5 (see FIG. 3) supporting the lid 4 relative to the case 3, as main structural elements. In the cup holder 1, the case 3 is connected to a rear face of a center console in such a way that an opening formed in the center console (not shown in the drawings) of the automobile and passing through in an up-and-down direction corresponds to the opening 2.

As shown in FIG. 3, the case 3 includes a bottom plate 11 whose back edge side extends in a right-and-left direction relative to a front edge side (i.e. right-and-left side edges are formed on a different level). At a front edge of the bottom plate 11, there is provided a front wall 12 projecting upward, and at a back edge of the bottom plate 11, a back wall 13 is projected upward. At respective front side portions of the right-and-left side edges of the bottom plate 11, there are projected front side walls 14 upward, and at respective back side portions of the right-and-left side edges of the bottom plate 11, there are projected back side walls 15 upward. The back side walls 15 are provided in positions of inclining outward to right and left relative to the front side walls 14, and slits 16 opening in a front-back direction and opening upward are formed between back edges of the front side walls 14 and front edges of the back side walls 15. A pair of front side walls 14 is continuous to right-and-left side edges of the front wall 12 in the respective front edges, and a pair of back side walls 15 is continuous to right-and-left side edges of the back wall 13 in the respective back edges. The opening 2 is defined by upper edges of the front wall 12, the back wall 13, the right-and-left front side walls 14, and the right-and-left back side walls 15. On an inner face of the back wall 13, there is formed a step portion 17 whose base portion protrudes forward on a different level and facing upward.

The lid 4 includes an approximately rectangular lid plate 18, and a right-and-left pair of arms 19 protruding vertically downward from the respective right-and-left side edges of the lid plate 18. The lid plate 18 is formed to have a length in a right-and-left direction longer than a distance between the right-and-left front side walls 14, and shorter than a distance between the right-and-left back side walls 15, and the right-and-left pair of arms 19 is respectively disposed between the front side walls 14 and the back side walls 15 in the right-and-left direction.

As shown in FIG. 2, at a center portion of a lower face of the lid plate 18, there is formed a concave portion 27, and at a back edge of the concave portion 27, there is supported a divider plate 20 through a hinge turnably within a predetermined range. The divider plate 20 can turn between a storage position which is fitted inside the concave portion 27 and a protruding position which protrudes from the concave portion 27 and is approximately orthogonal to the lower face of the lid plate 18. In a state wherein the lid 4 is open, the divider plate 20 is disposed in the protruding position and divides the opening 2 in such a way that two containers are inserted. A side edge of the divider plate 20 may be formed, for example, in an arc shape and the like in response to a shape of a container.

Figure 5:
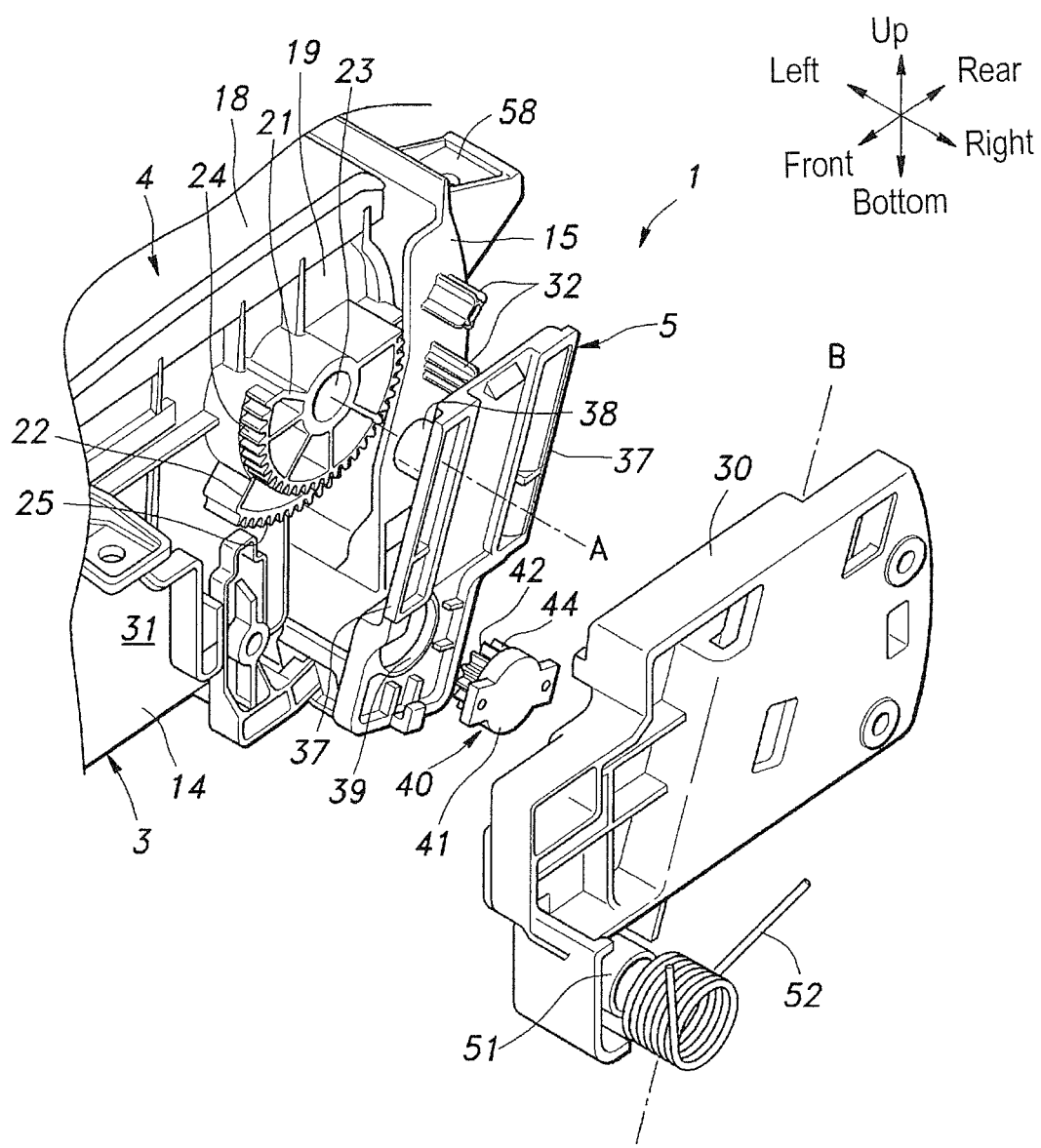
FIG. 5 is an exploded perspective view showing the right side portion of the cup holder according to the embodiment.

The right-and-left pair of arms 19 is respectively formed symmetrically. As shown in FIG. 3 and FIG. 5, on respective faces (outer faces) on respective opposed sides of the pair of arms 19, fan-shaped first convex portions 21 and second convex portions 22 are projected on a different level around an axis line A extending in the right-and-left direction. Compared to the second convex portion 22, the first convex portion 21 is set to have a smaller radius and a higher height (a protruding length in the right-and-left direction). On a protruding end face of the first convex portion 21, there is formed a support hole 23 having a circular cross-sectional surface as an axis line of the axis line A. The support hole 23 may be a through hole or a bottomed hole as well. In an outer peripheral portion of the first convex portion 21, there is formed a first arm gear 24 which is a spur gear with an external tooth around the axis line A. In an outer peripheral portion of the second convex portion 22, there is formed a second arm gear 25 which is a spur gear with an external tooth around the axis line A.

Figure 4:
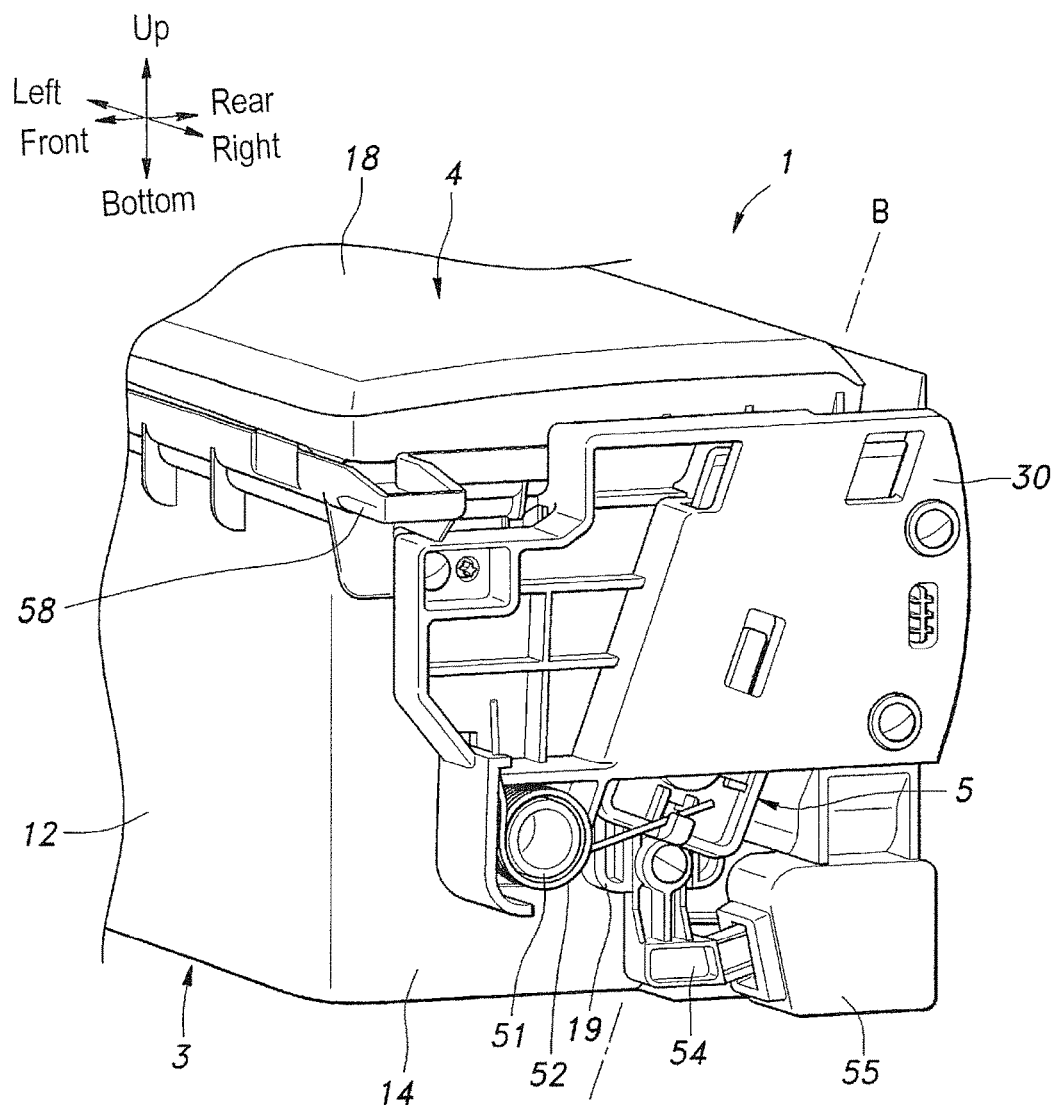
FIG. 4 is a perspective view showing a right side portion of the cup holder according to the embodiment.

As shown in FIG. 3 to FIG. 5, on outer face sides of the front side wall 14 and the back side wall 15 of the case 3, there are respectively provided side covers 30 in such a way as to cover outer faces of the front side wall 14 and the back side wall 15 from the sides. A right-and-left pair of side covers 30 is respectively formed symmetrically. The side cover 30 is connected to a front side on the outer face of the back side wall 15 and the outer face of the front side wall 14 in such a way as to form a space 31 (see FIG. 3, and FIG. 9 to FIG. 11) between the side cover 30 and the front side wall 14. A connection between the side cover 30 and the front side wall 14 and the back side wall 15 is carried out by fitting connection pieces 32 projecting on the outer faces of the front side wall 14 and the back side wall 15 into connection holes 33 (see FIG. 6) formed on an inner face (a face facing a case 3 side) of the side cover 30 to be screwed in. There, as for a connection structure, there may be used a locking structure between an elastic claw and a locking hole, a fastening structure by a screw, and the like. A lower edge of the side cover 30 is located away from the front side wall 14, and an opening (not shown in the figures) communicating the space 31 and an outside of the side cover 30 is formed between the side cover 30 and the front side wall 14.

Figure 6:
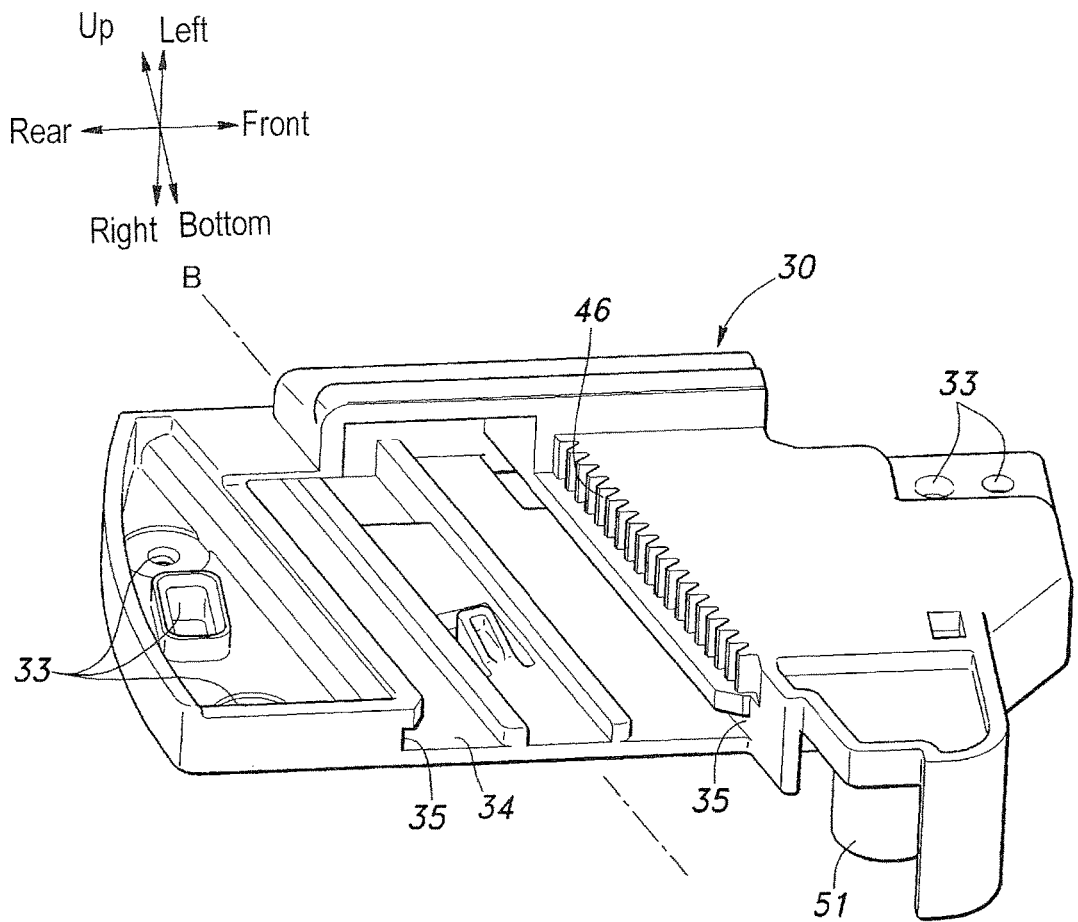
FIG. 6 is a perspective view in which a side cover is viewed from an inner face side according to the embodiment.

As shown in FIG. 6, on the inner face of the side cover 30, there is concaved a guide groove 34 extending along a straight line B. The straight line B is set to have an angle of 0° to 90° relative to a front-back directional axis, for example, it is preferable to tilt backward in such a way as to have an angle of 30° to 80° (i.e., to incline in such a way as to advance forward as advancing downward).

Figure 7:
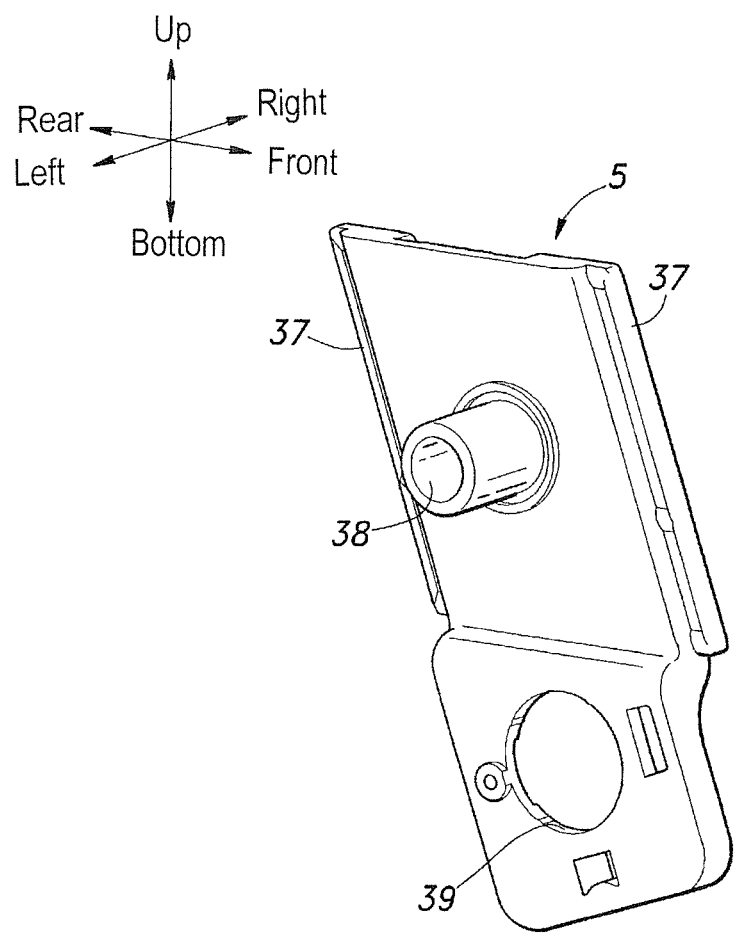
FIG. 7 is a perspective view in which a slider is viewed from an inner face side according to the embodiment.

As shown in FIG. 3, FIG. 5, and FIG. 7, the right-and-left pair of sliders 5 is mutually formed symmetrically. In the slider 5, a main face has a plate piece shape facing right and left, and through a step portion, a lower portion is disposed by inclining inward in the right-and-left direction more than an upper portion.

Figure 8:
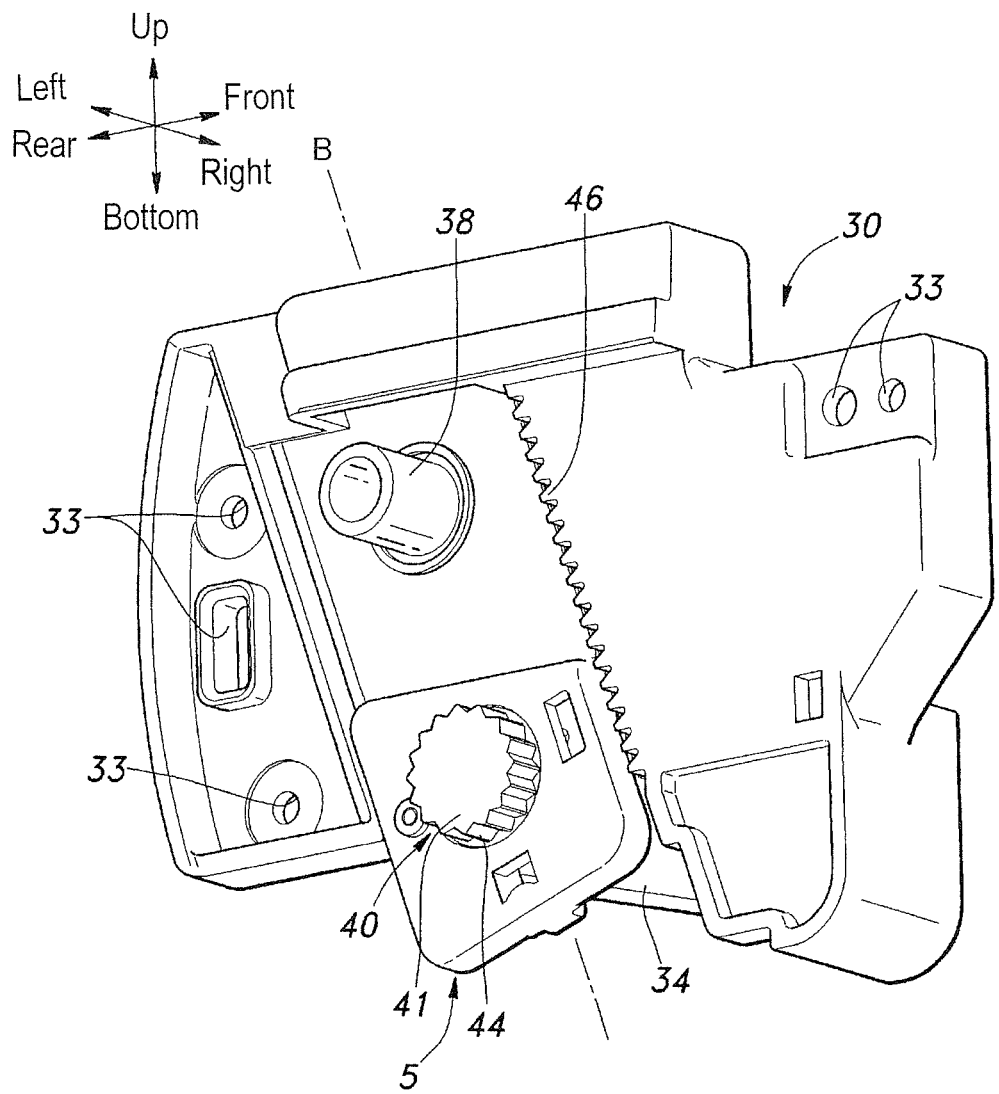
FIG. 8 is a perspective view showing a state wherein the slider is assembled to the side cover according to the embodiment.

As shown in FIG. 6, at base portions of side walls along the straight line B of the guide groove 34, there are formed locking grooves 35 extending along the straight line B. As shown in FIG. 7, in front and back edges of an upper portion of the slider 5, there are extended projection pieces 37 protruding to the front and back. As shown in FIG. 8, in the guide groove 34, there is received the slider 5 slidable along the straight line B. At that time, the projection pieces 37 of the slider 5 are locked in the locking grooves 35 of the guide groove 34, and the slider 5 cannot move in the right-and-left direction in the guide groove 34.

As shown in FIG. 5 and FIG. 7, on an inner face (a face facing the case 3 side) of the upper portion of the slider 5, there is formed a cylindrical support axis 38 protruding to the case 3 side. Each support axis 38 is inserted into each support hole 23 of the right-and-left pair of arms 19, so that the lid 4 is rotatably supported in the right-and-left pair of sliders 5.

In the lower portion of the slider 5, there is formed a damper attachment hole 39 penetrating in the right-and-left direction. In the damper attachment hole 39, there is supported a rotary damper 40. The rotary damper 40 includes a cylindrical housing 41 in which a viscous fluid such as silicone oil, grease, or the like is enclosed, and a rotor 42 whose one end is rotatably received in the housing 41 while the other end protrudes from the housing 41. At one end of the rotor 42, there is provided a rotor blade (not shown in the figures), and when the rotor blade rotates inside the housing 41, a fluid resistance of the viscous fluid is applied to the rotor as a rotational resistance. On the other end (a protruding end) of the rotor 42, there is formed a damper gear 44 which is a spur gear. The housing 41 is inserted into the damper attachment hole 39 from an outer face side (a side cover 30 side) of the slider 5, and is fastened to the slider 5 by a screw which is not shown in the figures. The damper gear 44 protrudes to an inner face side of the slider 5, and is engaged with the second arm gear 25 of the arm 19. Thereby, when the lid 4 rotates around the support axis 38 relative to the slider 5, a resistance force of the rotary damper 40 acts in a direction of attenuating a rotation of the lid 4.

As shown in FIG. 6, on the inner face of the side cover 30, and at a portion on a front side more than the guide groove 34, there is formed a rack 46. The rack 46 protrudes to the case 3 side and extends parallel to the straight line B. Teeth of the rack 46 face backward, and are engaged with the first arm gear 24 of the arm 19. Thereby, when the arm 19 rotates around the axis line A relative to the side cover 30, engagement portions between the first arm gear 24 and the rack 46 move along the rack 46, and the arm 19 and the slider 5 move along the straight line B relative to the side cover 30 and the case 3.

As shown in FIG. 3 to FIG. 6, in a lower portion of the side cover 30, there is projected a cylindrical spring support axis 51, and in the spring support axis 51, there is supported a coil portion of a coil spring 52. In the coil spring 52, one end is locked in the side cover 30, and the other end is locked in the slider 5 so as to urge the slider 5 to a lower front side along the straight line B relative to the side cover 30.

As shown in FIG. 1 to FIG. 5, in a lower end (a protruding end) of the arm 19, there is provided a striker 54 protruding backward. In a lower portion on the outer face of the back side wall 15, and below the side cover 30, there is provided a latch device 55 with which the striker 54 can engage. The striker 54 and the latch device 55 are disposed in such a way as to be mutually engaged at a fully closed time when the lid 4 closes the opening 2 of the case 3. The latch device 55 is disposed in such a way that the opening receiving the striker 54 faces forward, and is structured as a heretofore known push-push mechanism wherein when the striker 54 is inserted into the latch device 55, the latch device 55 locks the striker 54, and from a state wherein the striker 54 is locked, the striker 54 is pushed into an insertion direction again so as to unlock the striker 54. The latch device 55 may be, for example, a heart cam type or rotary cam type push-push mechanism.

As shown in FIG. 1 to FIG. 3, on upper edges of the front wall 12, the back wall 13, the pair of front side walls 14, and the side cover 30, there are projected plate-piece-like connection pieces 58 protruding in the front-back or right-and-left direction. Each connection piece 58 includes a through hole, and is connected to a back face of an instrument panel by a fastener or a screw inserted into the through hole.

Figure 9:
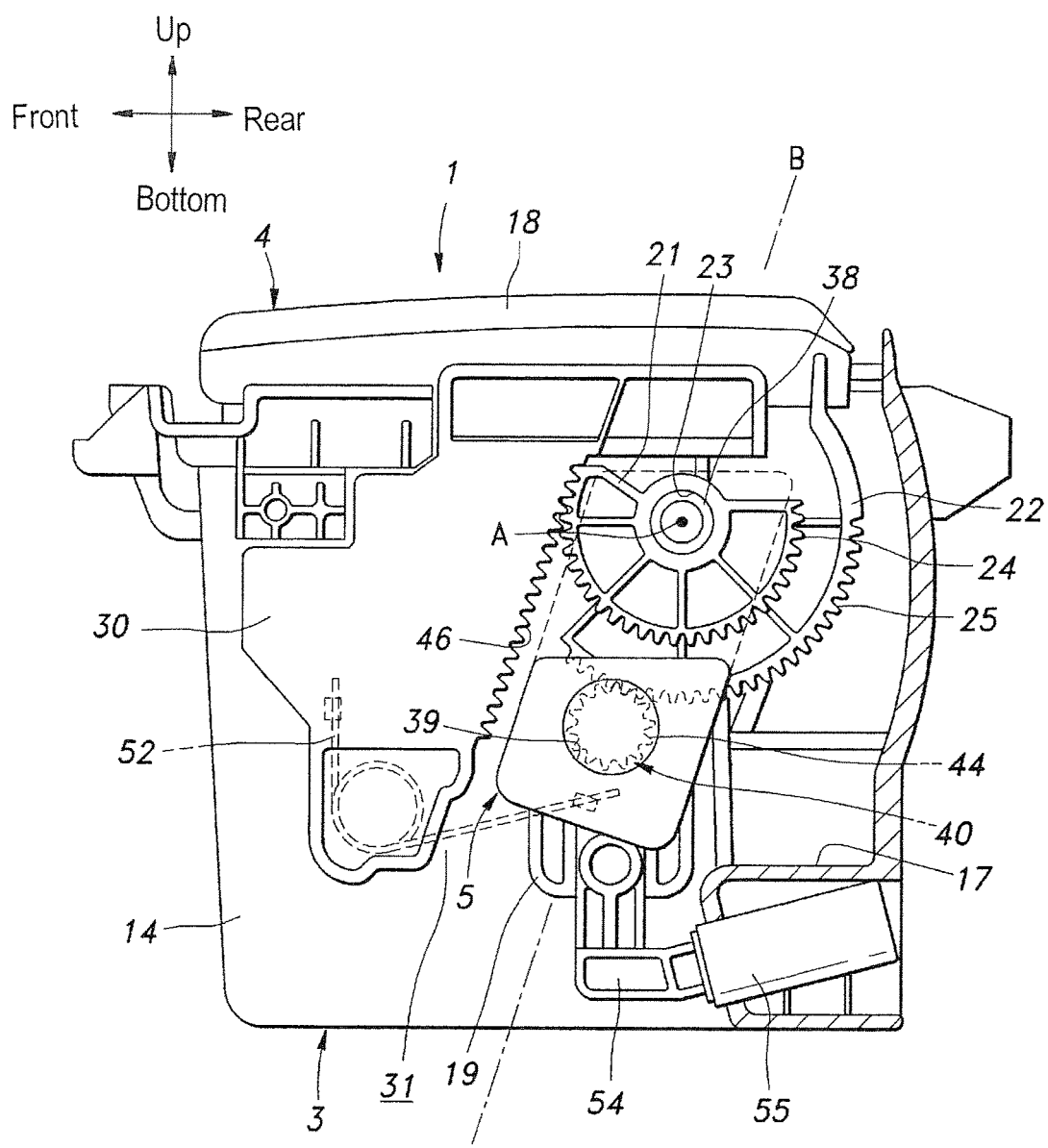
FIG. 9 is a schematic drawing showing a fully closed state of the cup holder according to the embodiment.
Figure 10:
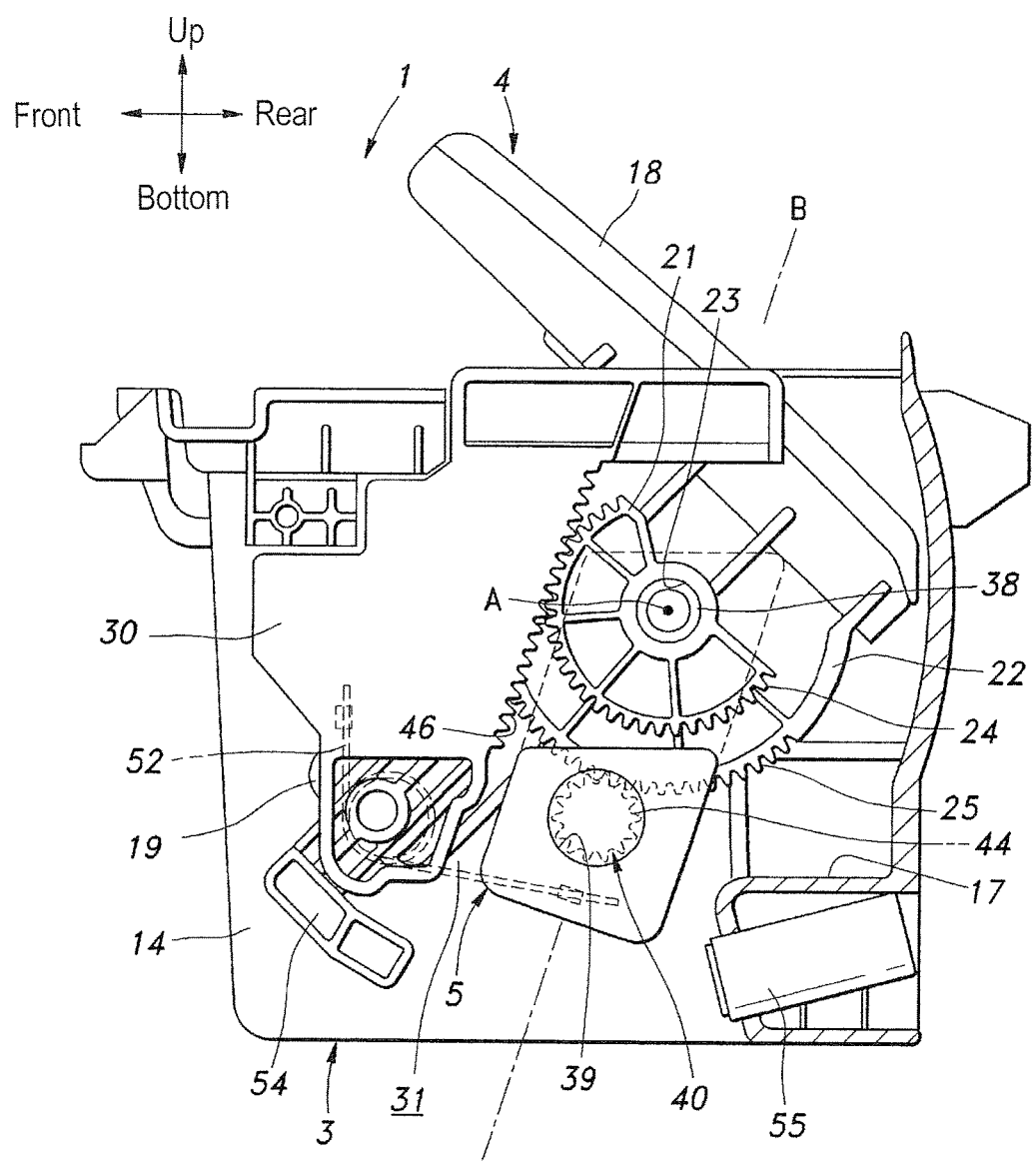
FIG. 10 is a schematic drawing showing a half-open state of the cup holder according to the embodiment.
Figure 11:
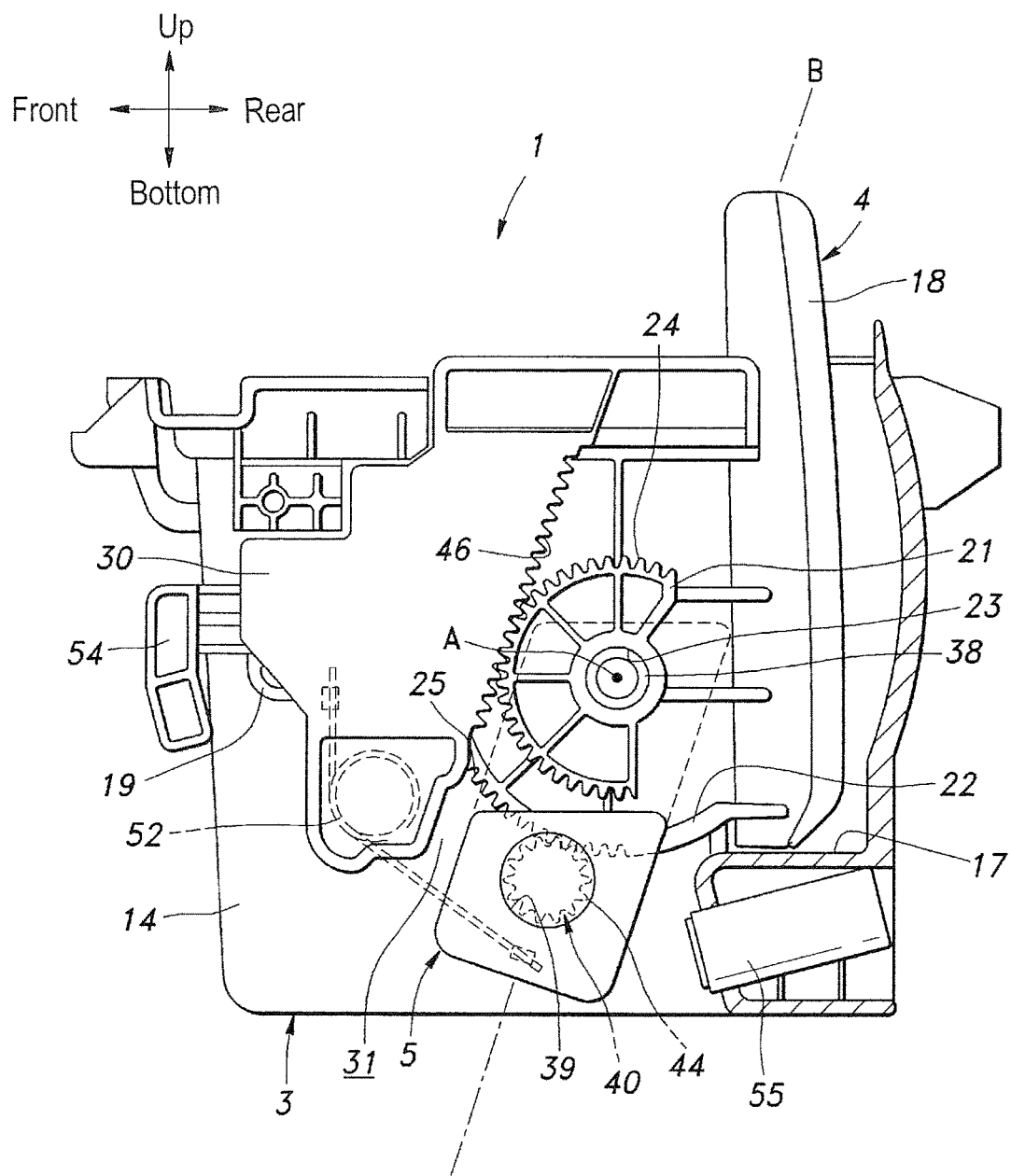
FIG. 11 is a schematic drawing showing a fully open state of the cup holder according to the embodiment.

An operation of the cup holder 1 structured as above will be explained. FIG. 9 to FIG. 11 are schematic drawings showing cross-sectional surfaces of a right side portion of the cup holder 1. As shown in FIG. 9, in a fully closed state of the cup holder 1, the lid 4 extends approximately horizontally in such a way that the lid plate 18 covers the opening 2. An edge portion of the lid plate 18 faces upper end faces of the front wall 12 and the right-and-left pair of front side walls 14 at a predetermined distance in an up-and-down direction. The pair of arms 19 is disposed on the outer face side of the front side wall 14 and an inner face side of the back side wall 15 through the slits 16 so as to extend in the up-and-down direction. The slider 5 is disposed in the upper portion inside the guide groove 34, and the first arm gear 24 is engaged with an upper portion of the rack 46. The striker 54 provided in the arm 19 is locked in the latch device 55, and the rotation of the lid 4 and a movement of the slider 5 are controlled. In that state, the coil spring 52 urges the slider 5 obliquely downward along the straight line B.

In the fully closed state, when a front edge portion of the lid plate 18 is pushed downward by one's fingers and the like, the lid 4 rotates counterclockwise (see FIG. 9, and hereinafter, a rotational direction will be determined on the basis of FIG. 9) in a view from a right side around the axis line A (the support axis 38). Thereby, the striker 54 is pushed into the latch device 55 in the insertion direction, and the locking of the striker 54 by the latch device 55 is released. When a downward push of the lid plate 18 by one's fingers and the like is released, as shown in FIG. 10, the slider 5 urged by the coil spring 52 moves to the lower front side along the straight line B, and the first arm gear 24 moves to the lower front side on the rack 46 while rotating clockwise by an engagement with the rack 46. Thereby, the lid 4 moves downward while opening the opening 2 by rotating clockwise around the axis line A. At that time, the lid plate 18 moves downward at a front side of the back wall 13. Also, the second arm gear 25 is engaged with the damper gear 44 of the rotary damper 40, so that the rotation of the lid 4 relative to the slider 5 and the case 3 is attenuated, and an opening operation of the lid 4 becomes slow.

As shown in FIG. 11, a back edge of the lid plate 18 bumps into the step portion 17 of the back wall 13, so that the rotation of the lid 4 relative to the case 3 is controlled, and the cup holder 1 comes to a fully open state.

When the cup holder 1 is changed from the fully open state to the fully closed state, the front edge portion of the lid plate 18 may be pushed forward or be pulled by one's fingers and the like against an urging force of the coil spring 52. The front edge portion of the lid plate 18 moves forward, so that the first arm gear 24 moves obliquely upward on the rack 46 while rotating counterclockwise around the axis line A, and the lid plate 18 closes the opening 2. At that time, the striker 54 is locked in the latch device 55, and the lid 4 is held in a fully closed position against the urging force of the twist coil spring 52.

When the cup holder 1 structured as above changes from the fully closed state to the fully open state, the axis line A which becomes a rotation axis of the lid 4 moves downward and frontward, so that the lid plate 18 is displaced to an inner side of the case 3, and an effect on an outline form of the case 3 by the lid plate 18 can be reduced. Namely, the cup holder 1 can be made compact.

Also, in the cup holder 1, the lid 4 is rotatably supported in the support axis 38 of the slider 5 slidable parallel to the rack 46, so that a distance between the axis line A which becomes a rotation axis of the first arm gear 24 and the rack 46 is always fixed, and an engagement between the first arm gear 24 and the rack 46 is maintained. Also, the lid 4 and the rotary damper 40 are both rotatably supported in the slider 5, so that a distance between the axis line A and an axis line of the rotary damper 40 is always fixed, and an engagement between the second arm gear 25 and the damper gear 44 is maintained.

Also, through the slider 5, the first arm gear 24 is always urged obliquely downward along the straight line B by the coil spring 52, so that teeth of the first arm gear 24 and the teeth of the rack 46 abut in a direction parallel to the straight line B. Namely, rattles are eliminated between the first arm gear 24 and the rack 46. Consequently, even if a vibration is applied to the cup holder 1, a low sound (a rattling sound) is controlled from being generated from the engagement portion between the first arm gear 24 and the rack 46.

In a case wherein a vehicle equipped with the cup holder 1 rides over an obstacle on a road surface, and a lower thrust G which is an upward acceleration is generated in the cup holder 1, depending on a center of gravity of the lid 4, there may be a case wherein an inertia force is generated in a direction of moving a front edge of the lid plate 18 downward. However, in the cup holder 1, simultaneously, the inertia force is applied downward to the slider 5, and the slider 5 is always urged by the coil spring 52, so that a clockwise rotational force is generated in the first arm gear 24 and the arm 19 so as to control a downward movement of the front edge of the lid plate 18. Consequently, when the lower thrust G is generated, an engagement between the striker 54 and the latch device 55 is prevented from being released unintentionally.

A specific embodiment has been explained in the above, and the present invention is not limited to the embodiment described hereinabove, and can be widely modified. In the present embodiment, the side cover 30 is formed as a separate member relative to the front side wall 14 and the back side wall 15, and has a structure of being connected to the front side wall 14 and the back side wall 15; however, the side cover 30 may be initially formed (molded) integrally in the front side wall 14 and the back side wall 15. Also, in the embodiment, the housing 41 of the rotary damper 40 is connected to the slider 5, and the damper gear 44 is formed in the rotor 42; however, the rotor 42 may be connected to the slider 5, and the damper gear 44 may be formed on an outer peripheral face of the housing 41. Also, a one-way function may be incorporated into the rotary damper 40 so as to generate the resistance force (a damping force) when the second arm gear 25 rotates clockwise, and not to generate the resistance force when the second arm gear 25 rotates counterclockwise. Also, a damper device may be installed between the support axis 38 and the support hole 23 as the rotary damper 40, or may be installed between the slider 5 and the case 3 as a piston damper. Also, as a device urging the slider 5, in place of the coil spring 52, heretofore known urging devices such as a tensile coil spring, a compression coil spring, and the like may be applied. In the present embodiment, the slider 5 is slidably supported in the guide groove 34; however, in place of the guide groove 34, the slider 5 may be slidably supported in a guide rail. Also, in the embodiment, one example wherein the storage device of the present invention is applied to the in-car cup holder 1 has been explained; however, the present invention is not limited to the cup holder housing a cup, and can be applied to a device housing various articles such as, for example, a glove compartment, a clothes case, and the like, and an opening/closing body is not limited to the lid, and may be a door.

EXPLANATION OF SYMBOLS

1 . . . a cup holder (a storage device), 3 . . . a case, 4 . . . a lid (an opening/closing body), 5 . . . a slider, 17 . . . a step portion, 18 . . . a lid plate, 19 . . . an arm, 21 . . . a first convex portion, 22 . . . a second convex portion, 23 . . . a support hole, 24 . . . a first arm gear (a first gear), 25 . . . a second arm gear (a second gear), 30 . . . a side cover (a side wall), 31 . . . a space, 34 . . . a guide groove (a guide device), 38 . . . a support axis, 40 . . . a rotary damper (a damper device), 41 . . . a housing, 42 . . . a rotor, 44 . . . a damper gear (a third gear), 46 . . . a rack, 51 . . . a support axis, 54 . . . a striker, 55 . . . a latch device, A . . . an axis line, B . . . a straight line

What is claimed is:

1. A storage device, comprising:
   a box-shaped case having an opening;
   an opening/closing body rotatably attached to the case to open and close the opening;
   a guide device extending along a predetermined straight line on a side wall of the case;
   a slider including a plate portion supported in the guide device slidably along the straight line, and a cylindrical support shaft protruding from a face of the plate portion facing the case toward the case and engaging the opening/closing body;
   an urging device provided between the case and the slider to urge the slider to one side along the straight line relative to the case;
   an arm extending from the opening/closing body, supported in the slider rotatably around a predetermined axis line, and having a first gear around the axis line and a support hole coaxially arranged to the first gear and receiving the support shaft of the slider so that the slider rotatably supports the opening/closing body;
   a damper device supported in the plate portion of the slider at a position away from the support shaft, for attenuating a rotational force of the arm relative to the slider; and
   a rack extending in the side wall parallel to the straight line, and engaging with the first gear,
   wherein when the opening/closing body rotates around the axis line relative to the case, the first gear and the rack are engaged with each other so that the opening/closing body moves along the straight line together with the slider while rotating around the support shaft of the slider.

2. A storage device according to claim 1, wherein the damper device includes a housing in which a viscous fluid is enclosed, and a rotor having one end rotatably received in the housing, and another end protruding from the housing,
   the arm includes a second gear around the axis line,
   one of either the housing or the rotor is connected to the slider, and
   a third gear is provided on an outer peripheral face of the other of either the housing or the rotor, and is engaged with the second gear.

3. A storage device according to claim 1, wherein the case includes a cover covering the side wall in such a way as to form a space between the case and an outer face side of the side wall,
   the arm is disposed in the space, and
   the guide device is provided at a portion facing a side wall side of the cover.

4. A storage device according to claim 3, wherein the urging device is a coil spring whose one end is locked in the cover, and whose other end is locked in the slider.

5. A storage device according to claim 1, wherein the plate portion of slider further includes a damper attachment hole to receive the damper device, and
   the arm includes a second gear around and coaxially arranged to the axis line to engage the damper device so that when the opening/closing body rotates around the support shaft relative to the slider, the rotational force of the arm is attenuated through the damper device.

6. A storage device according to claim 5, wherein the opening/closing body is structured so that when the opening/closing body is opened from a closed state, the urging device urges the slider to move in a direction away from the opening of the case, the slider slides along the guide device, and the first gear of the arm rotates along the rack.

7. A storage device according to claim 1, wherein the rack extends obliquely relative to the opening of the box-shaped case so that when the opening/closing body is opened from a closed state, the arm engaging the rack through the first gear moves obliquely downwardly along a line where the rack extends obliquely.

8. A storage device according to claim 5, wherein the guide device includes a groove extending along the predetermined straight line on the side wall of the case to receive the plate portion of the slider so that when the opening/closing body rotates around the axis line relative to the case, the first gear rotates along the rack, and the plate portion slides along the groove of the guide device while the second gear and the damper device are engaged to each other.

9. A storage device according to claim 8, wherein the second gear is coaxially arranged to the first gear and the support hole, and has a radius greater than that of the first gear.

\* \* \* \* \*